US008565916B2

(12) United States Patent
Zhang et al.

(10) Patent No.: US 8,565,916 B2
(45) Date of Patent: Oct. 22, 2013

(54) METHOD OF PRINTING INDICIA ON VESSELS TO CONTROL A BEVERAGE DISPENSER

(75) Inventors: Qiuchen Peter Zhang, Alpharetta, GA (US); Nilton Antonio Moreira Mattos, Roswell, GA (US); Louis Mattos, Jr., Douglasville, GA (US); Arthur G. Rudick, Atlanta, GA (US); H. Brock Kolls, Alpharetta, GA (US)

(73) Assignee: The Coca-Cola Company, Atlanta, GA (US)

( * ) Notice: Subject to any disclaimer, the term of this patent is extended or adjusted under 35 U.S.C. 154(b) by 567 days.

(21) Appl. No.: 12/767,049

(22) Filed: Apr. 26, 2010

(65) Prior Publication Data

US 2011/0260828 A1 Oct. 27, 2011

(51) Int. Cl.
*G06F 17/00* (2006.01)

(52) U.S. Cl.
USPC ............................ 700/235; 700/237; 700/240

(58) Field of Classification Search
USPC ........ 221/96; 141/94; 700/235, 237, 238, 240
See application file for complete search history.

(56) References Cited

U.S. PATENT DOCUMENTS

| | | | | |
|---|---|---|---|---|
| 5,058,630 | A | 10/1991 | Wiley et al. | |
| 6,053,359 | A | 4/2000 | Goulet et al. | |
| 6,100,518 | A | 8/2000 | Miller | |
| 6,394,153 | B2 * | 5/2002 | Skell et al. | 141/351 |
| 6,578,763 | B1 * | 6/2003 | Brown | 222/129.1 |
| 6,597,969 | B2 * | 7/2003 | Greenwald et al. | 700/235 |
| 6,705,356 | B2 | 3/2004 | Barton et al. | |
| 7,387,239 | B2 * | 6/2008 | Thomas et al. | 235/381 |
| 7,439,859 | B2 * | 10/2008 | Humphrey | 705/17 |
| 7,617,850 | B1 | 11/2009 | Dorney | |
| 8,151,832 | B1 | 4/2012 | Dorney | |
| 2003/0014210 | A1 | 1/2003 | Vock et al. | |
| 2003/0136837 | A1 | 7/2003 | Amon et al. | |
| 2005/0015348 | A1 | 1/2005 | Knepler | |
| 2005/0029287 | A1 | 2/2005 | Mobbs | |
| 2005/0087255 | A1 | 4/2005 | Humphrey et al. | |
| 2005/0212755 | A1 | 9/2005 | Marvit | |
| 2006/0151529 | A1 | 7/2006 | Crisp, III | |
| 2006/0238346 | A1 | 10/2006 | Teller | |
| 2006/0261156 | A1 | 11/2006 | Brown | |
| 2007/0215239 | A1 * | 9/2007 | Dorney | 141/94 |
| 2008/0148948 | A1 | 6/2008 | Evers et al. | |
| 2009/0040050 | A1 | 2/2009 | Humprhey | |
| 2009/0065520 | A1 | 3/2009 | Peters et al. | |
| 2009/0069947 | A1 * | 3/2009 | Newman | 700/281 |
| 2009/0113513 | A1 | 4/2009 | Dorney | |
| 2009/0152345 | A1 | 6/2009 | Johnson | |
| 2009/0205747 | A1 * | 8/2009 | Lillard, Jr. | 141/94 |
| 2010/0015558 | A1 | 1/2010 | Jarvis et al. | |
| 2010/0100849 | A1 | 4/2010 | Fram | |

OTHER PUBLICATIONS

Author: Tim O'Brien; Title: "Disney Looks to 'Fill' Needs of Guests with Refill Soft Drink Mugs", Dated: Aug. 26, 2002, pp. 1-2.

* cited by examiner

*Primary Examiner* — Timothy Waggoner
(74) *Attorney, Agent, or Firm* — Sutherland Asbill & Brennan LLP

(57) ABSTRACT

A method of printing indicia on a container to control a product dispenser. The method may include the steps of printing indicia on the container, the indicia controlling access to dispense from the product dispenser, reading the indicia about the product dispenser, determining if the container is authorized to use the product dispenser, and allowing a user to dispense a selected product type into the container.

15 Claims, 6 Drawing Sheets

Fig. 5
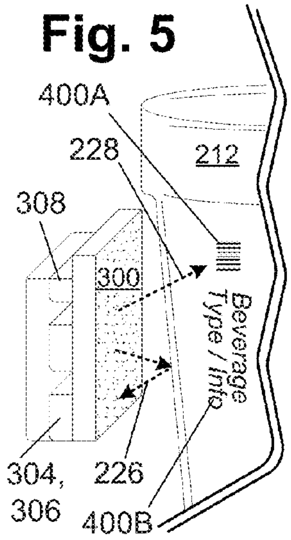
Fig. 6
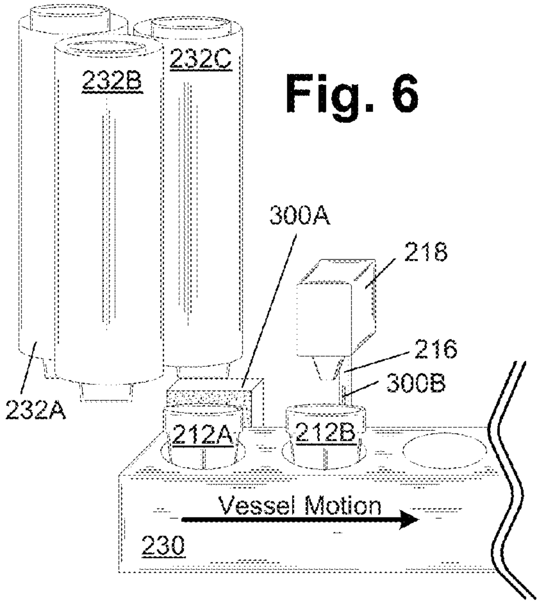
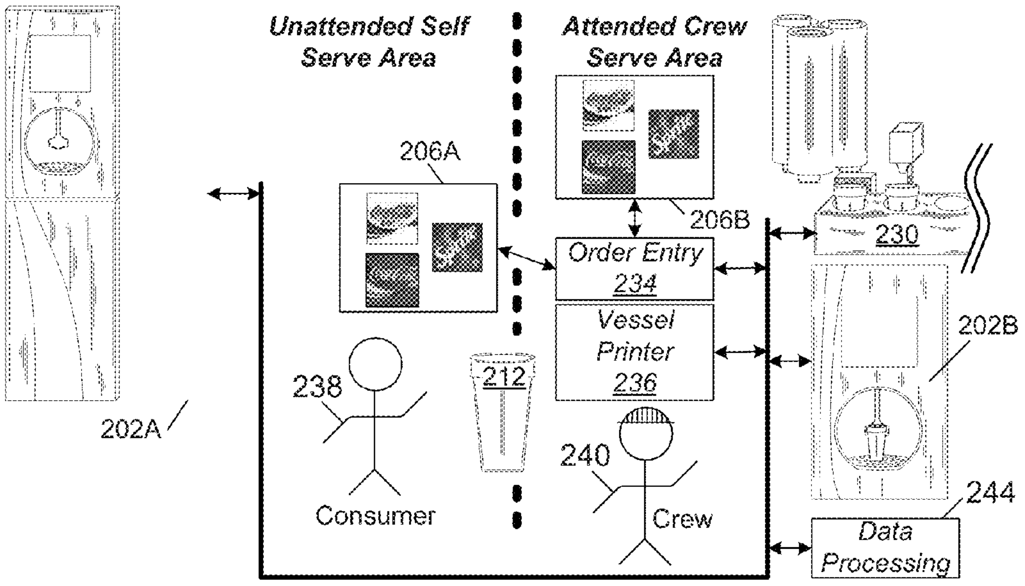
Fig. 7

METHOD OF PRINTING INDICIA ON VESSELS TO CONTROL A BEVERAGE DISPENSER

CROSS-REFERENCE TO RELATED APPLICATIONS

This application contains subject matter that is related to the subject matter of the following co-pending applications, each of which is assigned to the same assignee as this application, The Coca-Cola Company, Atlanta, Ga., U.S.A. Each of the following applications is hereby incorporated herein by reference in its entirety: "METHOD FOR MANAGING ORDERS AND DISPENSING BEVERAGES", application Ser. No. 12/767,050, filed herewith, and "VESSEL ACTIVATED, FOR USE WITH A BEVERAGE DISPENSER", application Ser. No. 12/767,048, filed herewith.

TRADEMARKS

The mark COCA-COLA® is a registered trademark of The Coca-Cola Company of Atlanta, Ga., U.S.A. Other marks used herein may be registered trademarks, tradenames, or product names of The Coca-Cola Company or other companies.

TECHNICAL FIELD OF THE INVENTION

This application relates generally to a method of printing indicia on a container to control a product dispenser. More specifically, the method may include preprinting indicia on a container, the indicia controlling access to a product dispensing station, reading the indicia at the product dispensing station, determining if the container is authorized to use the product dispensing station, and allowing a user to dispense a product type selected into the container.

BACKGROUND OF THE INVENTION

Generally described, there are few controls on access to a beverage dispenser or other type of product dispenser in an unattended environment. When a consumer is provided with a cup, the consumer may refill the cup as many times as desired. The consumer, however, also could fill other cups and other containers with beverages. Moreover, the consumer may not pay for the beverage or other product at all. As such, there are few consumer friendly ways to limit access to those customers who have purchased beverages or to limit the number of refills to an acceptable limit in the unattended beverage dispenser environment such as those found in quick or full serve restaurants.

The lack of controlled access to a beverage dispenser thus limits the types and kinds of environments in which self-serve beverage dispensers may be operated. As an example, it may be common in an amusement park for a guest to purchase a beverage cup and be allowed to refill the cup for a lower fee or for free. Without controlled access to the beverage dispensers, however, guests at the amusement park may attempt to fill any type of cup or container as well as not even paying for the original beverage. Even if a consumer purchased a cup with a serve yourself model for refills, there also may be no way to tell if the consumer purchased the cup today or the last time the consumer was at the amusement park. As such, it may be difficult to tell if the guest is honoring the policy of purchase a beverage and getting refills during that day.

There thus may be a need to control access to a beverage dispenser. In addition, there may be a need to be able to offer unattended access to beverage dispensers in dry locations (locations that currently do not have a beverage dispenser) and new markets such as amusement parks and other places to meet the changing needs of consumers.

SUMMARY OF THE INVENTION

The present application thus provides a method of printing indicia on a container to control a product dispenser. The method may include the steps of printing indicia on the container, the indicia controlling access to dispense from the product dispenser, reading the indicia about the product dispenser, determining if the container is authorized to use the product dispenser, and allowing a user to dispense a selected product type into the container.

The present application further provides a method of printing indicia on a vessel to control a beverage dispenser. The method may include the steps of placing the vessel proximate to a vessel motion detector, monitoring, by way of the vessel motion detector, vessel rotational or other motion, enabling a user to interact with a graphical user interface based in part on the vessel motion detector, allowing a user to select a beverage type to dispense from a menu of beverages, and printing indicia on the vessel related to the beverage type.

The present application further provides a method of printing indicia on a vessel to control a beverage dispenser. The method may include the steps of printing indicia on a vessel, the indicia controlling access to dispense from the beverage dispenser, reading the indicia about the beverage dispenser, determining if the vessel is authorized to use the beverage dispenser, enabling a user to interact with a graphical user interface and select a beverage type from a menu of beverages, and dispensing the beverage type selected into the vessel.

BRIEF DESCRIPTION OF THE FIGURES

The subject matter herein is particularly pointed out and distinctly claimed in the claims at the conclusion of the specification. The foregoing and other objects, features, and advantages of the present application may be apparent to one of ordinary skill in the art from the following detailed description taken in conjunction with the accompanying drawings.

FIG. 5 illustrates one example of a user interface device, vessel activated, for use with a beverage dispenser.

FIG. 6 illustrates one example of a user interface device, vessel activated, configured as an automated beverage system.

FIG. 7 illustrates one example of a quick or full serve restaurant beverage order entry and fulfillment network.

The detailed description explains the preferred embodiments of the application, together with advantages and features, by way of example with reference to the drawings.

DETAILED DESCRIPTION OF THE INVENTION

Figure 1A:
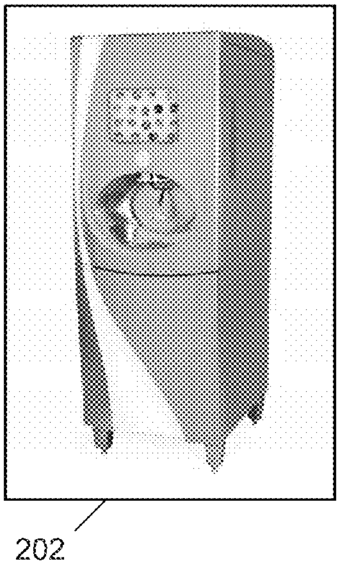
FIG. 1A illustrates one example of a micro-dosing beverage dispensing station including an interface portion of the micro-dosing beverage dispensing station.
Figure 1B:
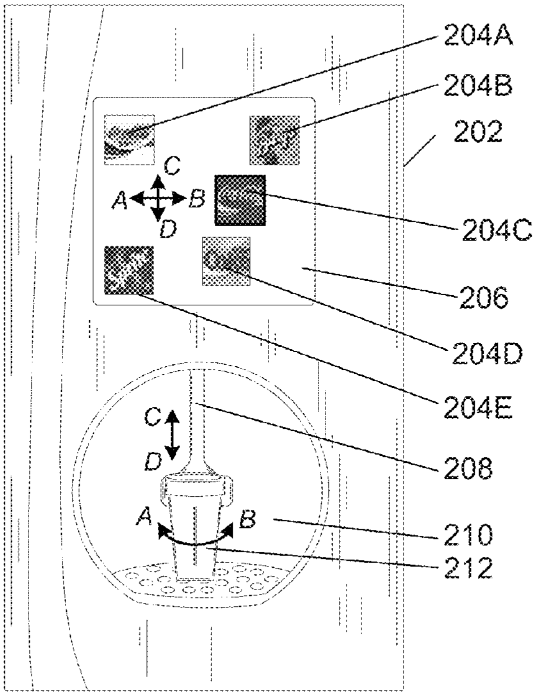
FIG. 1B illustrates one example of a micro-dosing beverage dispensing station including an interface portion of the micro-dosing beverage dispensing station.

Turning now to the drawings in greater detail, it will be seen that in FIGS. 1A and 1B there is a micro-dosing beverage dispensing station 202. The micro-dosing beverage dispensing station 202 may manage the dispensing of a number of concentrated ingredients, water, dairy, soy, sweetener, carbonated water, and or other beverage forming ingredients in precise recipes to form hundreds of different beverages. To effectuate the ability of a user to select which beverage recipe to dispense, a user accessible graphical user interface 206 may be provided. In this regard, a menu of beverage choices may be displayed on the graphical user interface 206 such as beverage selections 204A-204E.

For example and not as a limitation, a COCA-COLA ZERO™ beverage may be dispensed by selecting the COCA-COLA ZERO™ beverage selection 204A. In a similar fashion, a BARQ'S ROOT BEER® beverage may be dispensed by selecting the BARQ'S ROOT BEER® beverage selection 204B. A COCA-COLA® beverage may be dispensed by way of the beverage selection 204C, a DIET COKE® beverage may be dispensed by way of the beverage selection 204D, and a SPRITE® beverage may be dispensed by way of the beverage selection 204E. The beverage dispenser 202 may be configured to dispense hundreds of beverage types limited only by the ingredients needs to formulate a beverage recipe.

To facilitate the selection of the beverage type from the graphical user interface 206, a user generally was required to touch a touch screen. If the user's hands were full, this would require the user to put something down in order to free a hand to then make a beverage type selection. In certain other situations, the location of the touch screen may be too high for easy access by children or other types of consumers.

An advantage herein is that an additional user interface device 300 may be implemented to facilitate the ability to select and optionally dispense a beverage type. In this regard, the beverage dispenser 202, a beverage dispense region 210, an ice dispense lever 208, a beverage dispense lever 216 (shown in FIG. 2A) and/or locations that may have the user interface device 300 (shown in FIG. 3) capable of detecting the motion of a vessel 212. As is illustrated in FIG. 1B, a user may rotate the vessel 212 to move the selection on the graphical user interface 206 in the "A-B" direction. The user also may move the vessel 212 in the up or down direction to move the selection of the graphical user interface 206 in the "C-D" direction. For purposes herein, the user interface device 300 also may be referred to as a system 300. Alternatively, and to avoid the need to rotate the vessel 212, the vessel 212 may be provided with machine readable indicia 400E that, rather than only partially encircles the vessel 212, encircles the entire perimeter of the vessel 212 such that the user interface device 300 can read the indicia no matter what direction the vessel 212 is positioned.

This one handed user interface is an alternative to having to touch the touch screen 206 and thus effectuates that ability to select and optionally dispense the desired beverage. In a number of examples, this one handed beverage selection interface speeds beverage selection and dispense time in the crew-serve environment commonly found in quick or full serve restaurants environments. In general, a "crew-serve" dispense is operated by a "crew member" and a "self-serve" dispenser is operated by a consumer. The one handed operation frees the crew members from having to put down what they are carrying so as to select and dispense a beverage. In another example, children and other consumers that may be unable to reach the elevated graphical user interface 206 may make and optionally dispense a beverage selection by using only vessel motion to interact with the beverage dispenser. In another example, wheelchair-bound consumer or others have difficulty reaching the elevated graphical user interface 206 also may benefit from being able to select and dispense a beverage using only vessel motion to interact with the beverage dispenser.

Figure 2A:
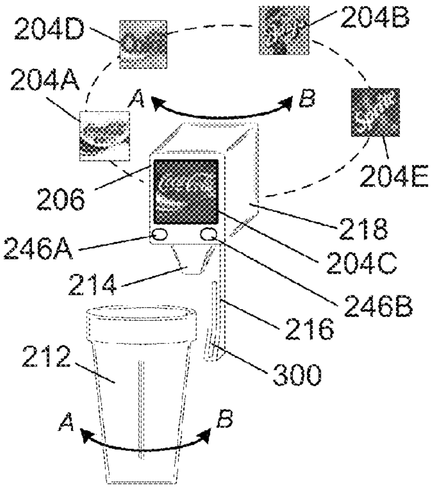
FIG. 2A illustrates one example of an interface portion of a beverage dispenser valve having a graphical user interface.
Figure 2B:
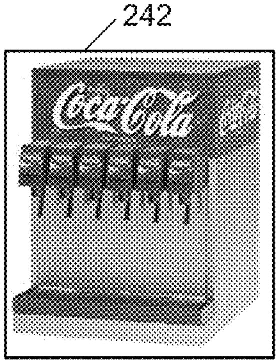
FIG. 2B illustrates one example of a known beverage dispenser valve.

Referring to FIG. 2A, there is illustrated one example of an interface portion of a beverage dispenser having the graphical user interface 206. In a conventional fountain dispenser 242 shown in FIG. 2B, a number of single flavor valves were orientated such that a user could only choose between finite numbers of beverage flavors. Embodiments of the conventional fountain dispensers typically support a dozen or less valves and as such a finite number of beverage type choices.

An advantage herein is that a single valve 218 may be configured with the graphical user interface 206. The dispenser lever 216 may be configured with the user interface device 300 such that a user may interact with the beverage valve to select a beverage type and then dispense the beverage into the vessel 212. In this regard, a user may move or rotate the vessel 212 in the "A-B" direction causing the beverage type to change on the graphical user interface 206. As the user rotates the vessel 212 in the "A" direction, the graphical user interface 206 displaying the flavor label changes from COCA-COLA® 204C to SPRITE® 204E to BARQ'S ROOT BEER® 204B to DIET COKE® 204D to COCA-COLA ZERO™ 204A and then back to COCA-COLA® 204C. Rotation of the vessel in the "B" direction reverses the flavor display pattern. The user thus has the ability to use the vessel 212 to select a beverage type and then dispense the beverage by activating the lever 216. Also shown in FIG. 2A are a beverage dispenser nozzle 214 and a number of touch buttons 246A-B. The touch buttons 246A-B may effectuate the ability of a user to interact with the valve 218 and optionally dispense the beverage by touch.

The valve 218 may be retrofit to a conventional fountain dispenser 242 or an automated beverage dispenser 230 (shown in FIG. 6). In this regard, the valve 218 having the graphical user interface 206 may be incorporated into existing conventional fountain equipment and automated beverage systems so as to effectuate the ability to select and dispense numerous beverages from the single valve 218 with the use of a user interface device 300.

Figure 3:
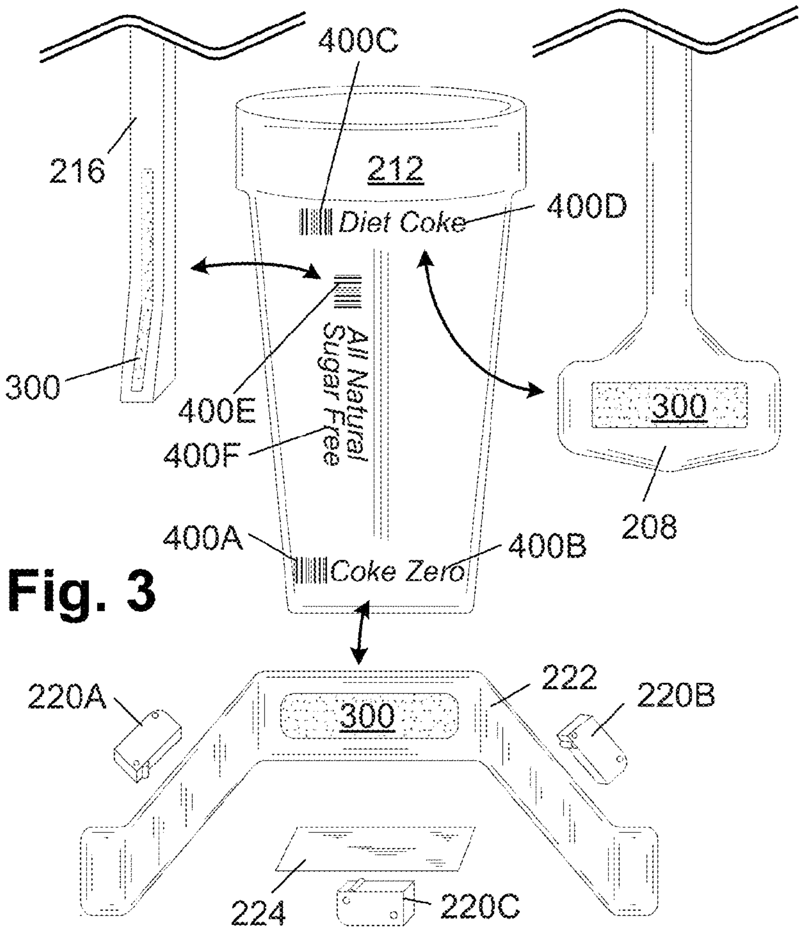
FIG. 3 illustrates one example of a number of interfaces capable of effectuating the ability to select and initiate the dispensing of a beverage from a beverage dispensing station.

Referring to FIG. 3, there is illustrated one example of a number of interfaces capable of effectuating the ability to select and initiate the dispensing of a beverage from a beverage dispensing station. The user interface device 300 may be incorporated into the dispense lever 216, the ice lever 208, or into the beverage dispense area using a dispense area lever 222, a dispense plate 224 or another device. As the vessel 212 comes into proximity of the system 300, the vessel motion may be detected and used to facilitate a selection of a beverage type on the graphical user interface 206. Once the beverage type has been selected, dispensing may be initiated by pressing the lever 216, the lever 208, actuating a number of switches 220A-C, or otherwise. The levers, switches, combinations thereof, and/or other types of actuators may be referred to as the dispense actuators. In this regard, the dispense actuators may be used to effectuate the dispensing of the beverage type selected. A number of levers such as the levers 208 and 216 may be utilized with the switches 220A-C so as to serve as a dispense actuator to enable a crew member, consumer, or other users to initiate and control dispensing of the beverage.

The switches 220A-C may be actuated by pushing the vessel 212 against the dispense lever 222 or the dispense plate 224. The dispense area lever 222 and the dispense plate 224 may have enough freedom to move such that one of the switches 220A-C may be actuated when the lever or plate are pushed by the vessel 212. In a multi-level menu on the graphical user interface, pushing the vessel 212 against the left side of the dispense area lever 222 and thus actuating the switch 220A may move the graphical user interface display to the next menu level while pushing the vessel 212 against the right side of the dispense area lever 222 and thus actuating the switch 220B may bring the graphical user interface back to the previous menu level.

In addition to detecting the motion of the vessel 212 and using such vessel motion to facilitate a beverage selection and optionally a beverage dispense, the system 300 may be configured to print indicia on the vessel 212. During the beverage selection and/or beverage dispense, a print mechanism 308 (shown in FIG. 4) associated with system 300 may print indicia on the vessel 212. Such indicia may be the type or kind of beverage selected and dispensed, a barcode that is machine readable, health and wellness information, product contents information, consumer loyalty data, and/or other indicia. As an example and not as a limitation, illustrated in the FIG. 3 is a machine readable indicia 400C and product information 400D horizontally oriented as printed by the system 300 associated with the lever 208. Also illustrated in the FIG. 3 is a machine readable indicia 400E and product information 400F vertically orientated as printed by the system 300 associated with the lever 216. Also illustrated in the FIG. 3 is a machine readable indicia 400A and product information 400B horizontally orientated as printed by the system 300 associated with the lever 222. Note that each of these indicia, 400A, 400C, and 400E could each be horizontally oriented at different levels on the vessel 212 (as shown with indicia 400C and 400A, but with the indicia completely encircling the vessel 212 to avoid the need for the user to rotate the indicia 400A, C, or E so it can be read by the user interface device 300 in any orientation. In this application, the user would simply elevate the cup to the desired level so that the desired indicia are read by the user interface device.

Figure 4:
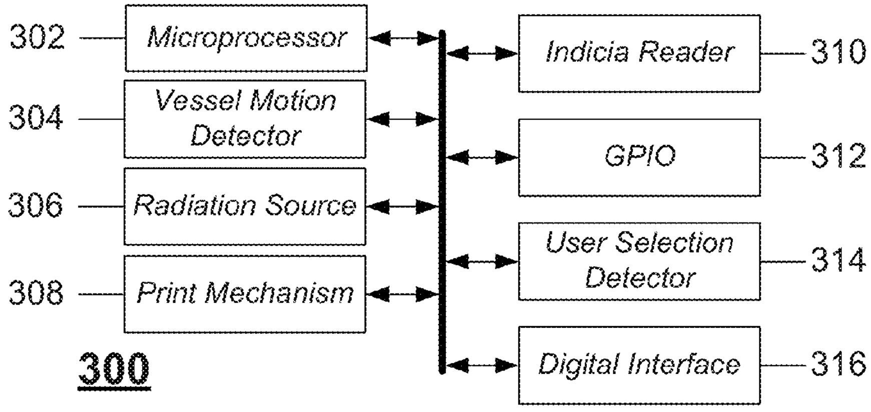
FIG. 4 illustrates one example of a system block diagram for a user interface device for use with a beverage dispenser.

Referring to FIG. 4, there is illustrated one example of a system block diagram for the user interface device 300 for use with the beverage dispenser. The system 300 may be integrated into a beverage dispensing station, a fountain dispenser, an automated beverage system, or other type of a beverage dispenser. Indeed the system may be integrated into any dispensing mechanism for dispensing any type of product, including, without limitation, food products, pharmaceutical products, candy, coffee (including beans and ground), paint, or any other product that can be dispensed and needs to be distinguished from other products that can be dispensed from the same dispensing mechanism. The system 300 may be utilized to effectuate the use of the vessel 212 to select a beverage type and optionally dispense a beverage. In addition, such a system 300 may be utilized to read machine readable indicia and/or print indicia on the vessel surface. Reading such indicia may effectuate the ability to program the dispenser to dispense certain beverage types, control access to the beverage dispensing station, program the beverage dispensing station, and/or effectuate other features.

The system 300 may have a microprocessor 302. Such a microprocessor 302 may be an INTEL, MOTOROLA, AMD, ZILOG, MICROCHIP, RABBIT, and/or other types and kinds of microprocessors, as may be required and/or desired. The microprocessor 302 may be interconnected with a vessel motion detector 304. A radiation source 306 may be used to illuminate a portion of the surface of the vessel 212. The backscatter then may be captured by the vessel motion detector 304. In this regard, the vessel motion detector 304 may determine the motion of the vessel 212 by monitoring the changes in the backscatter. The backscatter also may be referred to as the scatter data. The vessel motion effectuates the ability of the microprocessor 302 to implement instructions that perform the steps of determining the motion of the vessel by analysis of the scatter data, communicating data based in part on the scatter data, and effectuates the ability of the user to rotate or move the vessel to select a beverage type.

The radiation source 306 and the vessel motion detector 304 may be similar in design and manufacture to components found in an optical personal computer mouse or other type of optical pointing device design. In addition, the radiation source and the vessel motion detector may employ visible and non-visible light and/or other radiation sources and detectors. Furthermore, lasers, radio frequency techniques, and/or other radiation sources and/or vessel motion detector techniques and/or components may be employed in the design. Mechanical encoders also may be used in part as a vessel motion detector. The vessel motion detector 304 also may utilize mechanical position detection, rotary encoders, vessel contact means, and/or other vessel motion detection techniques.

Interconnected with the microprocessor 302 may be a print mechanism 308. Such a print mechanism 308 may be configured to print indicia on the surface of the vessel 212, as illustrated in FIG. 3, and/or in other ways. Such a print mechanism 308 may print by way of thermal, ink jet, radiation exposure of reactive inks applied on the vessel surface, and/or by other print methods. The print mechanism 308 may create graphics and text indicia by way of pixel based printing methods such as dot matrix style and/or by way of other type and or kinds of printing methods.

Interconnected with microprocessor 302 may be an indicia reader 310. The indicia reader 310 may read and process machine readable codes. Such machine readable codes may be a MICROSOFT TAG, a DATAMATRIX CODE, a QRC-CODE, a barcode, graphics, black and white tags, color tags, and/or other types of machine readable indicia.

Interconnected with the microprocessor 302 may be a number of general purpose inputs and outputs (GPIO) 312. In this regard, the microprocessor 302 may read and control external devices by way of the GPIO 312. For example and not as a limitation, the switches 220A-C may be monitored by the GPIO 312. The GPIO 312 also may be used to control lighting around the beverage dispense area 210 or to monitor and control other aspects and devices.

Interconnected with the microprocessor 302 may be a user selection detector 314. The user selection detector 314 may be used to detect the vessel 212 or the motion of the lever 208, the lever 216, and/or the lever 222. In this regard, the user selection detector 314 may be used to detect vessel motion so as to determine that a selection has been made by the user. For example and not as a limitation, the user moves the vessel 212 to select a beverage type. Once the beverage type is selected on the graphical user interface 206, the user can then tap or move the lever 208, the lever 216, and/or the lever 222. Such tapping or lever movement may be detected by the user selection detector 314 and used to confirm the selection the beverage type. In operation, this confirmation of the selected beverage type may be followed by the dispensing of ice, the beverage, and/or other actions. The user selection detector 314 may make use of an accelerometer, switches, and/or other user selection detector devices.

Interconnected with microprocessor 302 may be a digital interface 316. The digital interface 316 may be a universal serial bus (USB) port, a CAN bus interface, an infrared communication port, a serial port, a radio frequency port, or other type or kind of digital communication port. In this regard, the system 300 may be interfaced to and communicate with other digital devices by way of the digital interface 316.

Referring to FIG. 5 there is illustrated one example of the user interface device 300, vessel activated, for use with a beverage dispenser. The radiation source 306 may emit radiation 226 that reflects off the surface of the vessel 212 and may be monitored by the vessel motion detector 304. The vessel motion detector 304 may detect motion of the vessel 212 by way of received reflected radiation off the vessel surface from the radiation source 306 as scatter data associated with the vessel motion. The microprocessor 302 may implement instructions that perform the steps of determining the motion of the vessel by analysis of the scatter data. The data then may be communicated based in part on the scatter data so as to enable the user to interact with the graphical user interface 206. This effectuates the ability of the user to rotate or move the vessel 212 to select a beverage type and dispense the beverage.

The print mechanism 308 may be utilized to print the beverage type, beverage information, machine readable codes, and/or other indicia on the vessel 212. Such printing may be effectuated by way of transfer of ink jet printing, thermal printing, or radiation activated ink exposure with use of a radiation sources.

Referring to FIG. 6, there is illustrated one example of the user interface device 300, vessel activated, configured as the automated beverage system 230. An automated beverage system (ABS) 230 may be operationally related to an order entry system. Such an order entry system may be found at a quick or full serve restaurant. In operation, an order placed by way of the order entry system may cause the automated beverage system 230 to dispense a vessel from a vessel dispenser 232A-C and may be filled with a beverage automatically.

An advantage herein is that the indicia may be printed on the vessel 212 as initiated by way of an order being placed in the order entry system 234 (shown in FIG. 7). The indicia printed on the vessel 212 may include machine readable indicia, beverage type, and/or other indicia, and may be used to confirm that the vessel is authorized to receive product from the product dispenser. The vessel 212 then may be automatically dispensed from the vessel dispenser 232A-C into a vessel position 212A. The dispensed vessel 212 may have the indicia printed onto the vessel 212 as it is conveyed past the system 300A. Upon reaching a vessel position 212B, the lever 216 having a system 300B positioned thereon may read the indicia, configure the beverage type to be dispensed, and then dispense the beverage into the vessel 212. The indicia on the vessel 212 may be used to determine the beverage type to be dispensed and optionally other beverage parameters such as size, diet sweetener, non-diet sweetener, and/or the indicia that may be used to determine other aspects or features. The vessel dispenser 232A-C may be configured for small size vessels 232A, medium size vessels 232B, large size vessels 232C, and/or configured in other ways.

An advantage herein is that not only may the printed indicia be utilized to configure the beverage dispensing stations 202A-B, the beverage valves 218, and the automated beverage systems 230 to dispense a desired beverage type, but the indicia also may play a role in insuring order accuracy and consumer satisfaction. In this regard, by printing the beverage type on the surface of the vessel 212, the crew member may ensure that the consumer receives the correct beverage. Likewise if a consumer is purchasing several drinks, perhaps belonging to several family members, the humanly readable indicia 400B, D, and F printed on the surface of the vessel 212 ensures that each family member receives the correct beverage type. A fountain dispenser, the automated beverage system 230, the beverage dispensing station 202A-B, and the beverage dispenser may be referred to as a beverage dispenser, a beverage dispensing station, and/or crew-serve beverage dispenser.

Referring to FIG. 7, there is illustrated one example of a quick or full serve restaurant beverage order entry and fulfillment network. A consumer 238 may place an order with a crew member 240. Such an order may be placed in an order entry system 234. The order placement may require that the crew member select the beverage type desired by the consumer by way of a graphical user interface 206B. Alternatively, the consumer may be able to make a beverage selection from a consumer accessible graphical user interface 206A. The beverage dispensing station 202A-B, the automated beverage system 230, the graphical user interfaces 206A-B, the vessel printer 236, and the order entry station 234 may be networked together with a data processing system 244. In this regard, the data processing system 244 may be a local or a global network based data processing resource or a system accessible over a global network. The Internet may be considered a global network. The data processing system 244 may be utilized to effectuate the running of a quick or full serve restaurant including order entry management.

The vessel 212 may be printed and the crew member may hand the vessel 212 to the consumer. The consumer then may use the beverage dispensing station 202A to fill the vessel 212. The indicia printed on the vessel 212 may contain the order identification and the act of the consumer filling the vessel 212 at the beverage dispensing station may cause the indicia to be read including the order identification. Information about what the consumer dispensed into the vessel then may be communicated to the data processing system 244 managing orders such that the beverage information may be added to the order information. In this regard, order information may include the types, kind, and volume of beverage dispensed by the consumer.

This feature overcomes the current shortcomings that when a consumer buys a beverage in a self-serve environment, the crew member adds to the order a drink entry with no details as to what flavor or brand of beverage the consumer is going to consume. In addition, there is no way to track refills in a self-serve environment and as such the order information may be incorrect with respect to the type, kind, and volume of beverage dispensed by the consumer.

The crew-server member may initiate beverage filling by way of the automated beverage system 230. The consumer's order information, beverage type, other product information, and/or other indicia may be printed on the vessel 212 and filled at the automated beverage system 230. The crew member then benefits from having the beverage type, order identification, and/or other indicia printed on the surface of the vessel 212 to ensure that the correct beverage order is provided to the correct consumer. The consumer also benefits in that when they receive the beverages and distribute them to family members, each consumer is ensured that they are getting the correct beverage.

The crew-server member 240 may use the vessel 212 in combination with the user interface device 300 to select quickly a beverage type and dispense the beverage at the beverage dispensing station 202B. In this regard, the vessel 212 may be preprinted and read at the beverage dispensing station 202B and/or may be printed after the crew member 240 selects the desired beverage.

Figure 8:
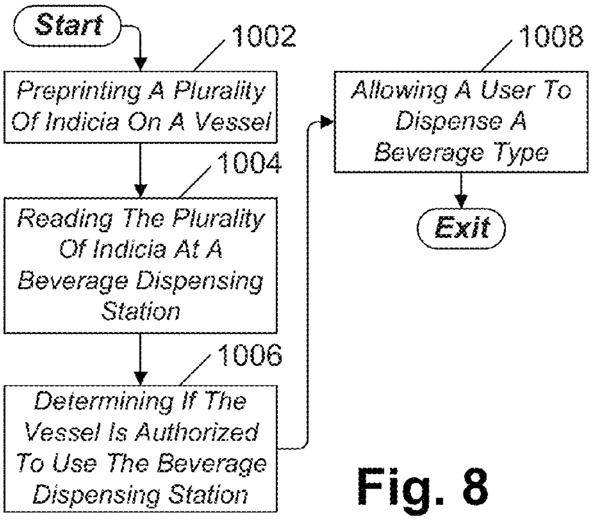
FIG. 8 illustrates one example of a method of printing indicia on vessels to control a beverage dispenser.

Referring to FIG. 8, an example of a method of printing indicia on vessels to control a beverage dispenser is shown. A number of indicia may be preprinted on the surface of the vessel 212. Such indicia may include beverage type, product information, machine readable codes, and/or other types of information. The preprinted indicia then may be read at a beverage dispensing station and/or otherwise used to configure the beverage dispensing station to authorize the vessel 212 and to allow use of the beverage dispensing station. After reading and authorizing the vessel indicia, a user may select and or dispense a beverage. The method begins in block 1002.

In block 1002, a number of indicia are preprinted on the vessel 212. In block 1004, the indicia are read at a beverage dispensing station. In block 1006, a determination as to whether the vessel 212 is authorized to use the beverage dispensing station may be effectuated. The indicia on the cup may be read, processed, and authorizing at a remote data processing resource to determine if the vessel 212 is authorized to use the beverage dispensing station. This feature may be used to limit effectively the number of refills. For example, a consumer at an amusement park may be authorized for unlimited refills of the vessel 212 limited to the day the vessel 212 was purchased. As such, the vessel authorization would be declined and the consumer would be prevented from refilling the vessel 212 if the consumer returns to the amusement park on a future day with the same vessel 212. In another example, should refills be limited to a finite number such as two, vessel authorization would allow and track vessel refills until the refill constraint or limit was reached. In block 1008, a user is allowed to dispense a beverage into the vessel 212. The method in then exited.

Figure 9:
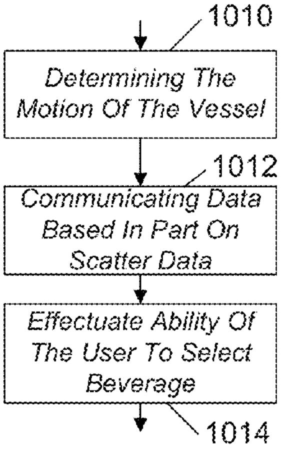
FIGS. 9-10 illustrate examples of exemplary embodiments of a method of printing indicia on vessels to control a beverage dispenser.
Figure 10:
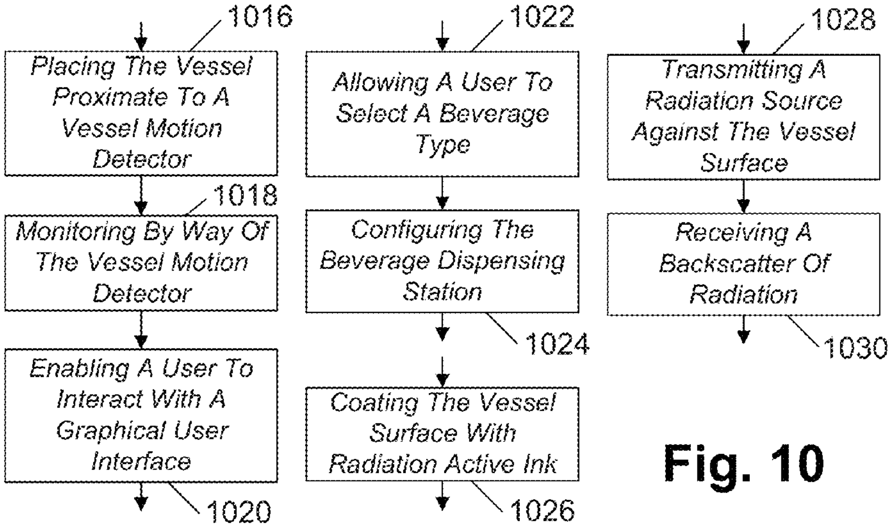

Referring to FIGS. 9-10 examples of a method of printing indicia on vessels 212 to control a beverage dispenser are shown. In block 1010, the vessel 212 may be placed proximate the vessel motion detector 304. The microprocessor may implement instructions that perform the steps of determining the motion of the vessel by analysis of the scatter data. In block 1012, data based in part on the scatter data is communicated such that a user is able to interact with the graphical user interface. In block 1014, such vessel motion detection and data communications of the analyzed scatter data effectuates the ability to rotate or move the vessel 212 to select the beverage type. The method is then exited.

In another example starting in block 1016, the vessel 212 may be placed proximate to a vessel motion detector 304. In block 1018, the rotational and other motion of the vessel 212 may be monitored by way of the vessel motion detector 304. In block 1020, a user may be allowed, or otherwise enabled, to interact with the graphical user interface. The method is then exited.

In an example starting in block 1022, a user may be allowed to select a beverage type. In block 1024, the beverage dispensing station may be configured in preparation of dispensing the select beverage type. The method is then exited.

In an example starting in block 1026, the surface of the vessel 212 may be coated with a radiation active ink also referred to as reactive ink. The reactive ink may be disposed on the surface of the vessel 212 before a wax or a sealant coating is applied to the vessel 212. The ink may then be exposed to create graphic and text indicia by pixel based exposure to a suitable radiation source. Such a suitable radiation source may be radio frequency, laser, infrared, and/or other radiation sources.

In another example starting in block 1028, a radiation source may be transmitted against the surface of the vessel 212. Such a radiation source may be used to reflect a backscatter so as to determine the rotational and other motion of the vessel 212. In block 1030, a backscatter of the radiation received from the radiation source reflects off the surface of the vessel 212 at the vessel motion detector 304. The method is then exited.

Figure 11:
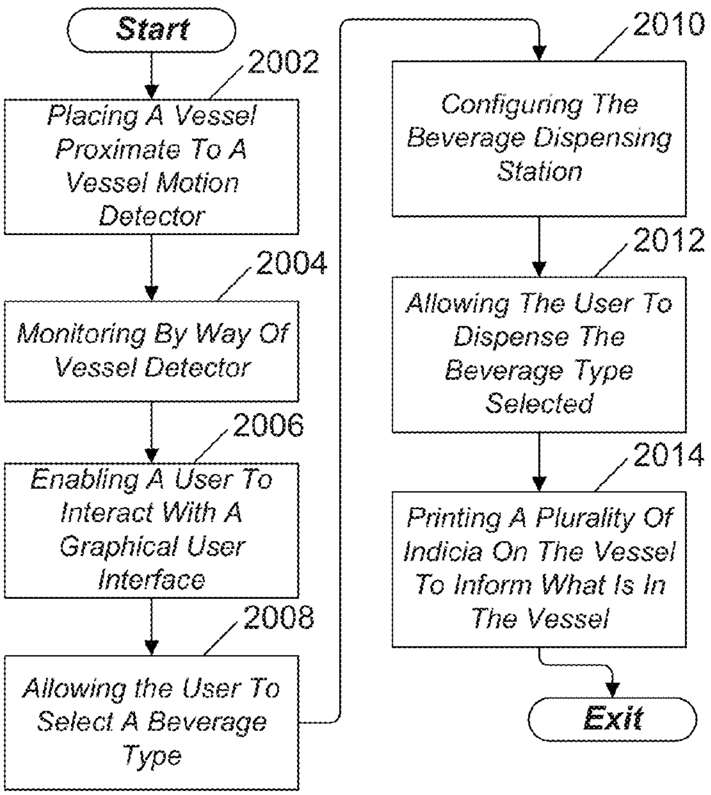
FIG. 11 illustrates one example of a method of printing indicia on vessels to control a beverage dispenser.

Referring to FIG. 11, an example of a method of printing indicia on vessels 212 to control a beverage dispenser is shown. The vessel 212 may be placed proximate to the vessel motion detector 304. The vessel motion may be monitored and used to select a beverage type. The user may be allowed to dispense the select beverage into the vessel 212. A number of indicia may then be printed on the vessel 212 to inform what is in the vessel 212. The method begins in block 2002.

In block 2002, the vessel 212 may be placed proximate to the vessel motion detector 304. In block 2004, the motion of the vessel 212 may be monitored by way of the vessel motion detector 304. In block 2006, the user may be allowed, or otherwise enabled, to interact with the graphical user interface based in part on the input of the vessel motion detector 304. In block 2008, the user may be allowed to select a beverage type from a menu of beverages. In block 2010, the beverage dispenser may be configured in preparation of dispensing the selected beverage type. In block 2012, the user may be allowed or otherwise enabled to dispense the selected beverage type into the vessel 212. In block 2014, a number of indicia may be printed on the surface of the vessel 212 to inform the user, consumer, and/or others of the beverage type or other information related to the beverage in the vessel 212. The method is then exited.

Figure 12:
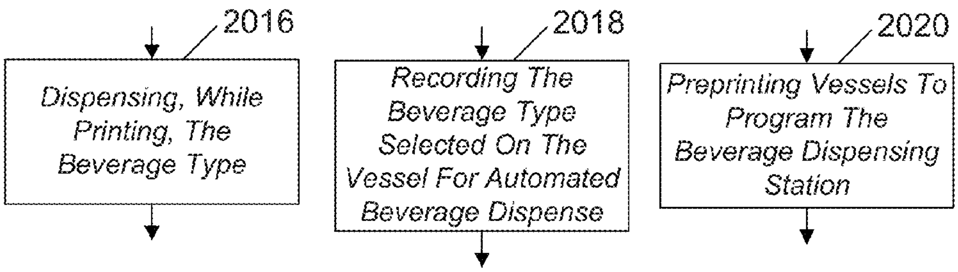
FIG. 12 illustrates examples of exemplary embodiments of a method of printing indicia on vessels to control a beverage dispenser.

Referring to FIG. 12, examples of a method of printing indicia on vessels to control a beverage dispenser are shown. In block 2016, the beverage dispensing station may simultaneously dispense the select beverage type into the vessel 212 while printing the indicia on the surface of the vessel 212.

In another example in block 2018, the beverage type selected may be recorded on the surface of the vessel 212 for an automated beverage dispense from a crew-serve beverage dispenser. The crew member may scan the indicia and the beverage dispenser may automatically dispense the selected beverage type at the beverage dispensing station 202A-B or the automated beverage system 230.

In another example in block 2020, the vessel 212 may be preprinted and then used to program the beverage dispenser station. The indicia printed on the vessel 212 may be read by the beverage dispensing station and used to program the beverage dispenser station, including programming operational, functional, configuration, and/or other types of instructions.

Figure 13:
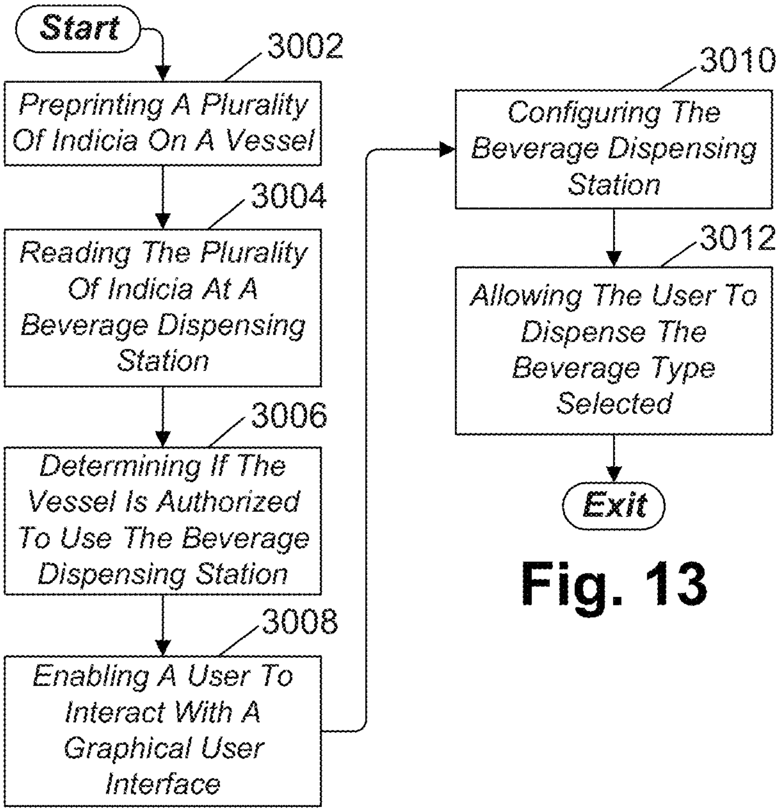
FIG. 13 illustrates one example a method of printing indicia on vessels to control a beverage dispenser.

Referring to FIG. 13, an example of a method of printing indicia on vessels to control a beverage dispenser is shown. The vessel 212 may be preprinted with indicia. The indicia may be read at a beverage dispensing station and a determination may be made as to whether the vessel is authorized to dispense a beverage from the beverage dispensing station. Such authorization may be validated with an order entry system, data processing resources, a global network based data processing resource, and/or by other methods. Upon successful authorization, the user may interact with the graphical user interface to select and dispense a beverage type into the vessel 212. The method begins in block 3002.

In block 3002, a number of indicia may be preprinted on the vessel 212. In block 3004, the indicia may be read at the beverage dispensing station. In block 3006, a determination as to whether the vessel 212 is authorized to use the beverage dispensing station may be effectuated. The indicia on the cup may be read and processed at a remote data processing resource to determine if the vessel 212 is authorized to use the beverage dispensing station. This feature may be used to limit effectively the number of refills. For example, a consumer at an amusement park may be authorized for unlimited refills of the vessel 212 on the day the vessel 212 was purchased. As such, the vessel authorization would be declined and the consumer would be prevented from refilling the vessel 212 if the consumer returned to the amusement park with the vessel 212 on a future day. In another example, vessel authorization would allow and track refills until the refill constraint was reached should refills be limited to a finite number such as two.

In block 3008, a user may be allowed, or otherwise enabled, to interact with the graphical user interface based in part on the input of the vessel motion detector 304. In block 3010, the beverage dispenser may be configured to dispense the selected beverage type. In block 3012, the user may be allowed to dispense the beverage into the vessel 212. The method is then exited.

Figure 14:
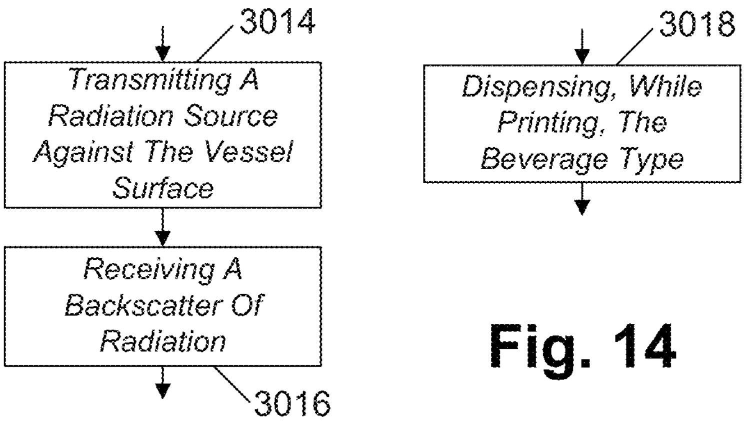
FIG. 14 illustrates examples of exemplary embodiments of a method of printing indicia on vessels to control a beverage dispenser.

Referring to FIG. 14, an example of a method of printing indicia on vessels to control a beverage dispenser is shown. In block 3014, a radiation source may be transmitted against the surface of the vessel 212. Such a radiation source may be used to reflect a backscatter to determine the rotation and other motion of the vessel 212. In block 3016, the backscatter of the radiation received from the radiation source is reflected off the surface of the vessel 212 at the vessel motion detector 304. The method is then exited. In another example in block 3018, the beverage dispensing station also may simultaneously dispense the select beverage type into the vessel 212 while printing the indicia on the surface of the vessel 212.

The capabilities herein may be implemented in software, firmware, hardware or some combination thereof. As one example, one or more aspects described herein may be included in an article of manufacture (e.g., one or more computer program products) having, for instance, computer usable media. The media may have embodied therein, for instance, computer readable program code means for providing and facilitating the capabilities herein. The article of manufacture may be included as a part of a computer system or sold separately. Additionally, at least one program storage device readable by a machine, tangibly embodying at least one program of instructions executable by the machine to perform the capabilities described herein may be provided.

The flow diagrams depicted herein are just examples. There may be many variations to these diagrams or the steps (or operations) described herein without departing from the spirit of the invention. For instance, the steps may be performed in a differing order, or steps may be added, deleted, or modified. All of these variations are considered a part of the claimed invention.

Although several embodiments of the invention have been described, it will be understood that those skilled in the art, both now and in the future, may make various improvements and enhancements that fall within the scope of the claims that follow and the equivalents thereof. These claims should be construed to maintain the proper protection for the invention first described.

We claim:

1. A method of printing indicia on a container to control a product dispenser, comprising:

receiving a user product type selection;

printing at least one product type indicia on the container, the product type indicia controlling access to dispense from the product dispenser;

reading the product type indicia about the product dispenser;

determining if the container is authorized to use the product dispenser; and allowing the selected product type to be dispensed into the container.

2. The method of claim 1, further comprising:

placing the container proximate to a container motion detector;

monitoring, by way of the container motion detector, container rotational or other motion; and enabling a user to interact with a graphical user interface based in part on the container motion detector.

3. The method of claim 1, further comprising allowing a user to select the product type from a menu of products.

4. The method of claim 1, further comprising coating the container with a radiation active ink.

5. The method of claim 1, wherein printing the indicia on the container comprises pixel radiation exposure from a print mechanism to form one or more text and/or graphic images on the container.

6. The method of claim 2, wherein enabling further comprises transmitting a radiation source against the container and receiving a backscatter of the radiation reflected off of the container.

7. The method of claim 6, further comprising determining the motion of the container by analysis of the backscatter, allowing the user to interact with the graphical user interface via the container motion detector, and allowing the user to rotate or move the container to select the product type.

8. A method of printing indicia on a vessel to control a beverage dispenser, comprising:

placing the vessel proximate to a vessel motion detector;

monitoring, by way of the vessel motion detector, vessel rotational or other motion;

enabling a user to interact with a graphical user interface based in part on the vessel motion detector;

allowing a user to select a beverage type to dispense from a menu of beverages; and printing indicia on the vessel related to the beverage type.

9. The method of claim 8, wherein printing further comprising dispensing, while printing, the beverage type into the vessel.

10. The method of claim 8, wherein printing the indicia on the vessel includes printing a plurality of beverage type product information.

11. The method of claim 8, further comprising recording the beverage type selected for an automated beverage dispense from a crew-serve beverage dispenser.

12. A method of printing indicia on a vessel to control a beverage dispenser, comprising:

receiving a selection of a beverage type from a menu of beverages via a graphical user interface;

printing beverage type indicia on the vessel, the beverage type indicia controlling access to dispense from the beverage dispenser;

reading the beverage type indicia about the beverage dispenser;

determining if the vessel is authorized to use the beverage dispenser; and dispensing the beverage type selected into the vessel.

13. The method of claim 12, wherein dispensing further comprises printing the beverage type indicia on the vessel simultaneously while the beverage type is being dispensed into the vessel.

14. The method of claim 12, wherein enabling further comprises:

transmitting a radiation source against the vessel;

receiving a backscatter of the radiation reflected off of the vessel at the vessel motion detector;

determining the motion of the vessel by analysis of the backscatter;

allowing a user to interact with the graphical user interface via the vessel motion detector; and allowing the user to rotate or move the vessel to select a beverage type.

15. A method of printing indicia on a surface to control a product dispenser, comprising:

receiving a selection of a product parameter for a product;

printing at least one product parameter indicia on the surface, the product parameter indicia controlling access to dispense the product from the product dispenser;

reading the product parameter indicia about the product dispenser;

determining if the product parameter indicia are authorized to configure the product dispenser to dispense the product; and dispensing the product from the product dispenser into a container when the product parameter indicia are authorized.

* * * * *